(12) United States Patent
Matsumoto et al.

(10) Patent No.: US 10,550,016 B2
(45) Date of Patent: Feb. 4, 2020

(54) WATER RECOVERY APPARATUS AND ELECTRODIALYSIS DEVICE

(71) Applicant: KURITA WATER INDUSTRIES LTD., Tokyo (JP)

(72) Inventors: Yukitaka Matsumoto, Tokyo (JP); Hideki Kobayashi, Tokyo (JP); Nobuhiro Orita, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 953 days.

(21) Appl. No.: 15/139,895

(22) Filed: Apr. 27, 2016

(65) Prior Publication Data

US 2017/0313602 A1 Nov. 2, 2017

(51) Int. Cl.
*C02F 1/42* (2006.01)
*C02F 1/461* (2006.01)
(Continued)

(52) U.S. Cl.
CPC ........ *C02F 1/46104* (2013.01); *B01D 61/422* (2013.01); *C02F 1/42* (2013.01);
(Continued)

(58) Field of Classification Search
CPC ...... C02F 1/46104; C02F 1/42; C02F 1/4604; C02F 1/4693; C02F 2101/10;
(Continued)

(56) References Cited

U.S. PATENT DOCUMENTS

| 6,348,143 B1 | 2/2002 | Serikawa et al. |
| 2009/0014377 A1* | 1/2009 | Janssen ..................... C02F 1/36 210/243 |
| 2016/0264443 A1* | 9/2016 | Matsumoto ........... C02F 1/4693 |

FOREIGN PATENT DOCUMENTS

| JP | 3746300 B2 | 2/2006 |
| JP | 2006-095526 A | 4/2006 |

(Continued)

OTHER PUBLICATIONS

WO 2015059841 A1 English translation by Google; Orita Nobuhiro; C02F1/42, entire document (Year: 2015).*

*Primary Examiner* — Walter D. Griffin
*Assistant Examiner* — Cameron J Allen
(74) *Attorney, Agent, or Firm* — Manabu Kanesaka

(57) ABSTRACT

Wastewater containing scale components, organic substances, inorganic ions, and the like, such as human effluent, generated in a closed system space, such as a nuclear shelter, a hazardous shelter, a space station or a moon-Mars mission manned spacecraft, or a lunar base is efficiently treated by a simple structural apparatus, so that water is recovered. After a hardness component is removed from water to be treated, such as human effluent, by a softening device, and heat exchange is performed between softening treated water and electrolysis treated water by a heat exchanger, by a high-temperature and high-pressure electrolysis device, organic substances, urea, ammonia, and the like are removed by electrolysis performed under high-temperature and high-pressure conditions. After the electrolysis treated water is processed by a deaeration treatment using a deaeration membrane device, a desalting treatment is performed by acid/alkali manufacturing electrodialysis devices and provided in series at two stages.

8 Claims, 4 Drawing Sheets

(51) Int. Cl.
  *B01D 61/42* (2006.01)
  *C02F 1/469* (2006.01)
  *C02F 101/30* (2006.01)
  *C02F 103/00* (2006.01)

(52) U.S. Cl.
  CPC ........ *C02F 1/4693* (2013.01); *C02F 2101/30* (2013.01); *C02F 2103/005* (2013.01); *C02F 2301/066* (2013.01); *C02F 2303/04* (2013.01)

(58) Field of Classification Search
  CPC .......... C02F 2103/005; C02F 2301/066; C02F 2301/106; C02F 2303/04; C02F 2303/08; C02F 2101/30; B01D 61/58; B01D 61/422
  See application file for complete search history.

(56) References Cited

FOREIGN PATENT DOCUMENTS

| | | |
|---|---|---|
| JP | 2010-119963 A | 6/2010 |
| JP | 2013-075259 A | 4/2013 |
| JP | 2015-080778 A | 4/2015 |
| WO | WO-2015059841 A1 * | 4/2015 ................ C02F 1/42 |

\* cited by examiner

WATER RECOVERY APPARATUS AND ELECTRODIALYSIS DEVICE

FIELD OF INVENTION

The present invention relates to a water recovery apparatus and a water recovery method, each of which recovers water by treating wastewater containing scale components, organic substances, inorganic ions, and the like, in particular wastewater, such as human effluent and living wastewater, which is generated in a closed system space. In more particular, the present invention relates to a water recovery apparatus and a water recovery method, each of which efficiently treats wastewater generated in a closed system space, such as a nuclear shelter, a hazardous shelter, a space station or a moon-Mars mission manned spacecraft, or a lunar base, using a simple structural device in this closed system space.

The present invention also relates to an electrodialysis device preferably functioning as a desalting device in this water recovery apparatus and to a desalting treatment method using this electrodialysis device.

BACKGROUND OF INVENTION

In the case in which human effluent, such as urine, and living wastewater, each of which is generated in a closed system space, such as a nuclear shelter, a hazardous shelter, a space station or a moon-Mars mission manned spacecraft, or a lunar base, are treated in this closed system space for water recovery, there are following restrictions.
1) Since the gravity is small in a cosmic space or the like, gas-liquid separation and solid-liquid separation using the gravity are difficult to be performed.
2) Since the space is a closed system space, emission gas species and the emission amount thereof are limited.
3) A high water recovery rate is required, and the electric power consumption and the installation space are required to be decreased.

In order to overcome the restrictions as described above, although a membrane distillation method (Patent Literature 1) has been proposed, the membrane distillation method has the following problems. That is, the problems are: since some type of effluent to be treated is volatile, and the effluent as described above cannot be removed by distillation or membrane distillation; when wastewater containing hardness components is evaporated, a scale trouble occurs; since effluent generally contains organic substances, such as proteins, fouling occurs, and as a result, the membrane distillation performance is degraded; and since a basic operation is distillation, the energy consumption amount is large.

Although a method for performing a membrane-type activated sludge treatment (Patent Literature 2) has been proposed as a pre-treatment of the membrane distillation, in this method, there have been problems in that, for example, when operation conditions are out of the range of appropriate values, microorganisms are liable to be deactivated, and when once deactivated, the microorganisms are not returned to the original conditions; and since $1/3$ to $1/2$ of organic substances are changed into sludge by an activated sludge, a sludge containing precious water is discharged as a waste.

As an apparatus which resolves the problems described above, a water recovery apparatus (Patent Literature 3) formed of a hardness-component rough removing device, a softening device, an electrolysis device, a catalyst decomposition device, and an electrodialysis device has been proposed.

However, even by this water recovery apparatus, there have been still the following problems. That is, for example, since the current efficiency of the electrolysis device low, and the electric power consumption is large, more improvement thereof is required; since a mixed gas of oxygen/hydrogen is generated in the electrolysis device, and in addition, since chlorine oxides, such as hypochlorous acid, chloric acid, and perchloric acid, each of which is the load on the electrodialysis device provided at a latter stage, are generated, a countermeasure means therefor is required to be provided; in order to treat organic substances which cannot be removed by electrolysis using the electrolysis device and oxide substances, such as perchloric cid, generated thereby, the catalyst decomposition device is required to be provided at a latter stage of the electrolysis device; in consideration of the installation space, the maintenance, and the like, a simpler structure is desired; and in the electrodialysis device, since an acid and an alkali are directly manufactured, the water recovery rate of the entire system is decreased to a low level.

On the other hand, although a treatment of water containing organic substances and reducing substances by electrolysis under high temperature and high pressure conditions (Patent Literature 4) has been known, the application of this treatment to the water recovery in a closed space and the decomposition of urea have not been suggested, and furthermore, problems, such as influences on the treatments at a former stage and/or a latter stage of the water recovery performed in a closed system space, which may arise when the system is formed have not been disclosed at all.

In order to provide a water recovery apparatus in which wastewater containing scale components, organic substances, inorganic ions, and the like, in particular wastewater, such as human effluent and living wastewater, generated in a closed system space, such as a nuclear shelter, a hazardous shelter, a space station or a moon-Mars mission manned spacecraft, or a lunar base, is efficiently treated by a simple structural device without having concerns about clogging caused by the scale generation and fouling caused by the organic substances and without consuming a large amount of energy such as that of evaporation, intensive research was carried out by the present inventors, and it was found that after those types of wastewater described above are treated by a softening device to sufficiently remove hardness components, when oxidizable substances, such as an organic substance and ammonia, are electrolyzed by electrolysis under high temperature and high pressure conditions, and subsequently, ions are removed by an electrodialysis device, product water and a salt concentrated liquid can be obtained, that is, it was found that in the case in which in order to decompose oxidizable substances, such as an organic substance, urea, and ammonia, in the wastewater, electrolysis is performed under high temperature and high pressure conditions, the above problems can be resolved by the following operation mechanism, and hence, the patent application was submitted in the past (Japanese Unexamined Patent Application Publication No. 2015-80778, hereinafter, referred to as "prior application").

By the electrolysis performed under high temperature and high pressure conditions, oxidizable substances in the wastewater can be changed into ions of carbonic acid, organic acids, nitric acid, and the like, each of which can be directly removed by the electrodialysis device provide at a latter stage.

By this electrolysis performed under high temperature and high pressure conditions, organic substances in the wastewater are partially electrolyzed into a carbon dioxide gas, and ammonia and nitric acid are partially electrolyzed into a nitrogen gas. Hence, the catalyst decomposition device provided at a latter stage of the electrolysis device in Patent Literature 3 can be omitted. In addition, under a high pressure condition, a gas generated by the electrolysis is dissolved in water by the pressure, and contact inhibition of the oxidizable substances to an electrode surface caused by air bubbles can be suppressed. In addition, since the treatment is performed at a high temperature, a pyrolytic effect can be used, and in addition, a material transport rate can be increased, so that the electrolysis efficiency can also be increased. Furthermore, since a reaction in which a hydrogen gas and an oxygen gas generated by the electrolysis of water are again returned to water can be performed, from a highly explosive mixed gas of hydrogen/oxygen, the oxygen concentration can be decreased, and by-product gases each can be made safe to have a value lower than the explosion limit thereof, and furthermore, the water recovery rate can also be increased. In addition, since the generation of oxides by the electrolysis is suppressed, the load on the electrodialysis device provided at a latter stage of the electrolysis device can be reduced.

As the electrodialysis device of the water recovery apparatus according to the prior application, a desalting electrodialysis device and an acid/alkali manufacturing electrodialysis device are preferably provided in series.

In this case, as shown in FIG. 4, the desalting electrodialysis device is a two-chamber type electrodialysis device in which between an anode and a cathode, repeating units including a concentration chamber, an anion exchange membrane AM, a desalting chamber, a cationic exchanged membrane CM, a concentration chamber, - - - are provided with an electrode chamber and a bipolar membrane BPM at each side so that the concentration chambers are provided at the respective electrode sides. In the desalting electrodialysis device, an anion $X^-$ and a cation $Y^+$ forming a salt (XY) in water to be treated which is allowed to pass through the desalting chambers are concentrated in the respective concentration chambers through the anion exchange membrane AM and the cation exchange membrane CM, respectively, so that desalted water is obtained from the desalting chamber, and in addition, from the concentration chamber, a salt concentrated liquid is obtained.

On the other hand, in general, the acid/alkali manufacturing electrodialysis device is a three-chamber type electrodialysis device, and as shown in FIG. 5, between an anode and a cathode, repeating units including an acid chamber, an anion exchange membrane AM, a desalting chamber, a cation exchange membrane CM, an alkali chamber, - - - are provided with an electrode chamber and a bipolar membrane BPM at each side so that the acid chamber is provided at an anode side, and the alkali chamber is provided at a cathode side. As shown in FIG. 5, an anion $X^-$ and a cation $Y^+$ in water to be treated are moved into the acid chamber and the alkali chamber through the anion exchange membrane AM and the cation exchange membrane CM, respectively, so that desalted water is obtained from the desalting chamber, and in addition, an acid solution and an alkali solution are also obtained from the acid chamber and the alkali chamber, respectively. That is, since the chambers adjacent to the desalting chamber are not the concentration chambers in which the anion $X^-$ and the cation $Y^+$ are concentrated but are the acid chamber in which anions are only concentrated to generate $H^+$ from the water and the alkali chamber in which cations are only concentrated to generate $OH^-$ from the water, the structure of the acid/alkali manufacturing electrodialysis device is different from that of the desalting electrodialysis device.

Patent Literature 1: Japanese Patent Publication 2006-095526A

Patent Literature 2: Japanese Patent Publication 2010-119963A

Patent Literature 3: Japanese Patent Publication 2013-075259A

Patent Literature 4: Japanese Patent 3746300 B

Patent Literature 5: Japanese Patent Publication 2015-80778A

According to the water recovery apparatus of the prior application, wastewater containing scale components, organic substances, inorganic ions, and the like can be efficiently treated by a simple structural device without having concerns about clogging caused by the scale generation and fouling caused by the organic substances and without consuming a large amount of energy such as that of evaporation; however, there have been the following troubles.

<Problem Caused by High-Temperature and High-Pressure Electrolysis Device> i) By electrolysis, gases, such as a hydrogen gas derived from the electrolysis of water and carbon dioxide derived from the electrolysis of organic substances, are generated. In addition, a small amount of dissolved gas, such as oxygen, is present in original water. Since the explosion risk is generated by mixing of a hydrogen gas and oxygen, a safety countermeasure is required. By a high-temperature and high-pressure electrolysis device, although the amount of an oxygen gas generated thereby can be reduced, the generation of a hydrogen gas and a carbon dioxide gas cannot be completely stopped.

When a gas generated in the high-temperature and high-pressure electrolysis device is mixed as air bubbles in the electrodialysis device provided at a latter stage, the bubbles thus formed function as the resistance of the electrodialysis, and as a result, the voltage is increased. Furthermore, the amount of air bubbles thus generated is increased, and in a closed system, in order to secure the volume corresponding to the volume of the air bubbles thus generated, the size of the device is increased.

ii) The electric power consumption is large.

<Problems Caused by Electrodialysis Device>

1) By the electrodialysis device provided at one stage, treated water having a sufficient water quality cannot be obtained.

2) From the above (1), in the case in which an electric deionizing device is provided at a latter stage of the electrodialysis device, treated water having a high water quality can be obtained; however, the electric power consumption is excessively increased.

3) According to the prior application, although the desalting electrodialysis device and the acid/alkali manufacturing electrodialysis device are provided, in this case, between the desalting electrodialysis device and the acid/alkali electrodialysis device, a tank is required to be provided.

In order to increase the water quality of the treated water, the desalting electrodialysis devices are necessarily provided at two stages, and in this case, three electrodialysis devices, that is, two desalting electrodialysis devices and one acid/alkali electrodialysis device, are required.

4) As is the electrolysis device, also in the electrodialysis device, a hydrogen gas is generated in a cathode chamber, and an oxygen gas is primarily generated in an anode chamber by the electrolysis of water, so that a problem similar to that of the electrolysis device occurs.

SUMMARY OF INVENTION

The present invention aims to resolve the problems described above and to provide a water recovery apparatus and a water recovery method, each of which has a more excellent treatment efficiency than that of the water recovery apparatus of the prior application, an electrodialysis device effective for this water recovery apparatus, and a desalting treatment method using this electrodialysis device.

Through intensive research carried out to resolve the problems described above, the present inventors invented a water recovery apparatus and a water recovery method according to one of the following [1] to [4], [11], and [12], and an electrodialysis device and a desalting treatment method according to one of the following [5] to [10].

[1] A water recovery apparatus which treats wastewater and recovers treated water as product water, the water recovery apparatus comprising:

a softening device removing a hardness component in the wastewater;

a high-temperature and high-pressure electrolysis device in which softening treated water in the softening device is electrolyzed by supplying a direct current at a temperature of 100° C. to the critical temperature of the softening treated water and under a pressure at which the softening treated water maintains a liquid phase so as to electrolyze an oxidizable substance in the softening treated water; and an electrodialysis device in which electrolysis treated water obtained by the high-temperature and high-pressure electrolysis device is processed by a desalting treatment to obtain desalted water, wherein a heat exchanger which heats the softening treated water by heat exchange between the softening treated water flowing into the high-temperature and high-pressure electrolysis device and the electrolysis treated water is provided.

[2] A water recovery apparatus which treats wastewater and recovers treated water as product water, the water recovery apparatus comprising:

a softening device removing a hardness component in the wastewater;

a high-temperature and high-pressure electrolysis device in which softening treated water in the softening device is electrolyzed by supplying a direct current at a temperature of 100° C. to the critical temperature of the softening treated water and under a pressure at which the softening treated water maintains a liquid phase so as to electrolyze an oxidizable substance in the softening treated water; and an electrodialysis device in which electrolysis treated water obtained by the high-temperature and high-pressure electrolysis device is processed by a desalting treatment to obtain desalted water, wherein a deaeration means for processing a deaeration treatment on the electrolysis treated water is provided, and deaeration treated water of the deaeration means is treated by the electrodialysis device.

[3] A water recovery apparatus which treats wastewater and recovers treated water as product water, the water recovery apparatus comprising:

a softening device removing a hardness component in the wastewater;

a high-temperature and high-pressure electrolysis device in which softening treated water in the softening device is electrolyzed by supplying a direct current at a temperature of 100° C. to the critical temperature of the softening treated water and under a pressure at which the softening treated water maintains a liquid phase so as to electrolyze an oxidizable substance in the softening treated water; and an electrodialysis device in which electrolysis treated water obtained by the high-temperature and high-pressure electrolysis device is processed by a desalting treatment to obtain desalted water, wherein a deaeration means for processing a deaeration treatment on electrode water discharged from an electrode chamber of the electrodialysis device is provided, and deaeration treated water of the deaeration means is circulated to the electrode chamber of the electrodialysis device.

[4] A water recovery apparatus which treats wastewater and recovers treated water as product water, the water recovery apparatus comprising:

a softening device removing a hardness component in the wastewater;

a high-temperature and high-pressure electrolysis device in which softening treated water in the softening device is electrolyzed by supplying a direct current at a temperature of 100° C. to the critical temperature of the softening treated water and under a pressure at which the softening treated water maintains a liquid phase so as to electrolyze an oxidizable substance in the softening treated water; and an electrodialysis device in which electrolysis treated water obtained by the high-temperature and high-pressure electrolysis device is processed by a desalting treatment to obtain desalted water, wherein the electrodialysis device includes acid/alkali manufacturing electrodialysis devices which treat the electrolysis treated water and obtain the desalted water, an acid solution, and an alkali solution, and the acid/alkali manufacturing electrodialysis devices are connected in series at two stages or more so that desalted water of an acid/alkali manufacturing electrodialysis device at an upstream side is processed by a desalting treatment of an acid/alkali manufacturing electrodialysis device at a downstream side.

[5] An electrodialysis device in which acid/alkali manufacturing electrodialysis devices, each of which treats water to be treated and obtains desalted water, an acid solution, and an alkali solution, are connected in series at two stages or more so that desalted water of an acid/alkali manufacturing electrodialysis device at an upstream side is processed by a desalting treatment of an acid/alkali manufacturing electrodialysis device at a downstream side, wherein water having a low ion concentration as compared to that of water which is allowed to pass through an acid chamber and an alkali chamber of the acid/alkali manufacturing electrodialysis device at an upstream side is allowed to pass through an acid chamber and an alkali chamber of the acid/alkali manufacturing electrodialysis device at a downstream side, and an acid solution and an alkali solution obtained by the acid/alkali manufacturing electrodialysis device at a downstream side are allowed to pass through the acid chamber and the alkali chamber of the acid/alkali manufacturing electrodialysis device at an upstream side, respectively.

[6] The electrodialysis device according to [5], wherein an acid storage bath storing an acid solution obtained by the acid/alkali manufacturing electrodialysis device at an upstream side and the acid/alkali manufacturing electrodialysis device at a downstream side and an alkali storage bath storing an alkali solution obtained by the acid/alkali manufacturing electrodialysis device at an upstream side and the acid/alkali manufacturing electrodialysis device at a downstream side are provided, and the acid solution and the alkali solution obtained by the acid/alkali manufacturing electrodialysis device at a downstream side are allowed to pass through the acid chamber and the alkali chamber of the acid/alkali manufacturing electrodialysis device at an upstream side via the acid storage bath and the alkali storage bath, respectively.

[7] An electrodialysis device in which acid/alkali manufacturing electrodialysis devices, each of which treats water to be treated and obtains desalted water, an acid solution, and an alkali solution, are connected in series at two stages or more so that desalted water of an acid/alkali manufacturing electrodialysis device at an upstream side is processed by a desalting treatment of an acid/alkali manufacturing electrodialysis device at a downstream side, wherein the acid/alkali manufacturing electrodialysis devices each include between an anode and a cathode, a buffer chamber defined by two chambers adjacent thereto and bipolar membranes, and the water to be treated is processed by a desalting treatment by being allowed to sequentially pass through the buffer chamber of the acid/alkali manufacturing electrodialysis device at a downstream side, the buffer chamber of the acid/alkali manufacturing electrodialysis device at an upstream side, a desalting chamber of the acid/alkali manufacturing electrodialysis device at an upstream side, and a desalting chamber of the acid/alkali manufacturing electrodialysis device at a downstream side in this order.

[8] The electrodialysis device according to [5] or [6],
wherein the acid/alkali manufacturing electrodialysis devices each include between an anode and a cathode, a buffer chamber defined by two chambers adjacent thereto and bipolar membranes, and the water to be treated is processed by a desalting treatment by being allowed to sequentially pass through the buffer chamber of the acid/alkali manufacturing electrodialysis device at a downstream side, the buffer chamber of the acid/alkali manufacturing electrodialysis device at an upstream side, a desalting chamber of the acid/alkali manufacturing electrodialysis device at an upstream side, and a desalting chamber of the acid/alkali manufacturing electrodialysis device at a downstream side in this order.

[9] The electrodialysis device according to any one of [5] to [8], wherein the acid/alkali manufacturing electrodialysis devices each include: an anode water deaeration and circulation means in which anode water discharged from an anode chamber of the acid/alkali manufacturing electrodialysis device is processed by a deaeration treatment, and deaeration treated water is circulated to the anode chamber; and a cathode water deaeration and circulation means in which cathode water discharged from a cathode chamber is processed by a deaeration treatment, and deaeration treated water is circulated to the cathode chamber.

[10] A desalting treatment method in which a desalting treatment is performed by allowing water to be treated to pass through the electrodialysis device according to any one of [5] to [9].

[11] The water recovery apparatus according to any one of [1] to [4], wherein the electrodialysis device is an electrodialysis device according to any one of [5] to [9].

[12] A water recovery method in which wastewater is treated by the water recovery apparatus according to any one of [1] to [4] and [11] to recover treated water as product water.

Advantageous Effects of Invention

According to the present invention, wastewater containing scale components, organic substances, inorganic ions, and the like can be efficiently treated by a simple structural device, and treated water can be recovered and reused without having concerns about clogging caused by the scale generation and fouling caused by the organic substances and without consuming a large amount of energy such as that of evaporation. Hence, in a cosmic space, such as a space station or a spacecraft, water essential for human life maintenance can be reused, and humans can stay in a cosmic space for a long time.

According to the water recovery apparatus of a first aspect of [1], since the softening treated water and the electrolysis treated water are heat-exchanged by the heat exchanger so as to preheat the softening treated water, the heat of the electrolysis treated water at a high temperature is recovered and is effectively used, so that the electric power consumption can be reduced.

According to the water recovery apparatus of a second aspect of [2], since the electrolysis treated water is processed by the deaeration treatment using the deaeration means, without diffusing steam, a gas generated by the electrolysis is removed, and the safety can be enhanced. Hence, while the water recovery rate is maintained high, the electric power consumption can be increased, and furthermore, the increase in resistance and the increase in voltage caused by air bubbles mixed in the electrodialysis device provide at a latter stage can be prevented.

According to the water recovery apparatus of a third aspect of [3], a gas generated in the electrode chamber of the electrodialysis device is deaerated, so that the increase in resistance and the increase in voltage caused by the generated gas can be prevented.

In particular, the explosion risk can be avoided by the deaeration of a hydrogen gas generated in the cathode chamber. When being deaerated and recovered, an oxygen gas generated in the anode chamber can also be used as cabin air in a closed system space.

According to the water recovery apparatus of a fourth aspect of [4], by the acid/alkali manufacturing electrodialysis devices provided in series at two stages or more, no tank is required between the acid/alkali manufacturing electrodialysis devices, and treated water having a high water quality can be obtained. In the case of the acid/alkali manufacturing electrodialysis device, by two acid/alkali manufacturing electrodialysis devices provided in series at two stages, treated water having a high water quality which sufficiently satisfies the standard values of drinking water can be obtained. In addition, compared to the case in which an electric deionizing device is provided at a latter stage, at a water recovery rate similar to that of the above case, the electric power consumption can be reduced.

According to the electrodialysis devices of a fifth to ninth aspects of [5]-[9], by the acid/alkali manufacturing electrodialysis devices connected in series at two stages or more, the desalting treatment can be highly performed, and treated water having a high water quality can be efficiently obtained.

DESCRIPTION OF EMBODIMENTS

Hereinafter, with reference to the drawings, although embodiments of the present invention will be described in detail, the present invention is not limited to the following embodiments as long as without departing from the scope thereof.

In addition, hereinafter, although the case in which the present invention is applied to a water recovery apparatus which treats wastewater generated in a closed system space for reuse thereof will be primarily described by way of example, the present invention can be applied not only to the treatment and recovery of wastewater generated in a closed system space but can also be applied to the treatment and recovery of various types of wastewater containing scale components, organic substances, inorganic ions, and the like.

Figure 1:
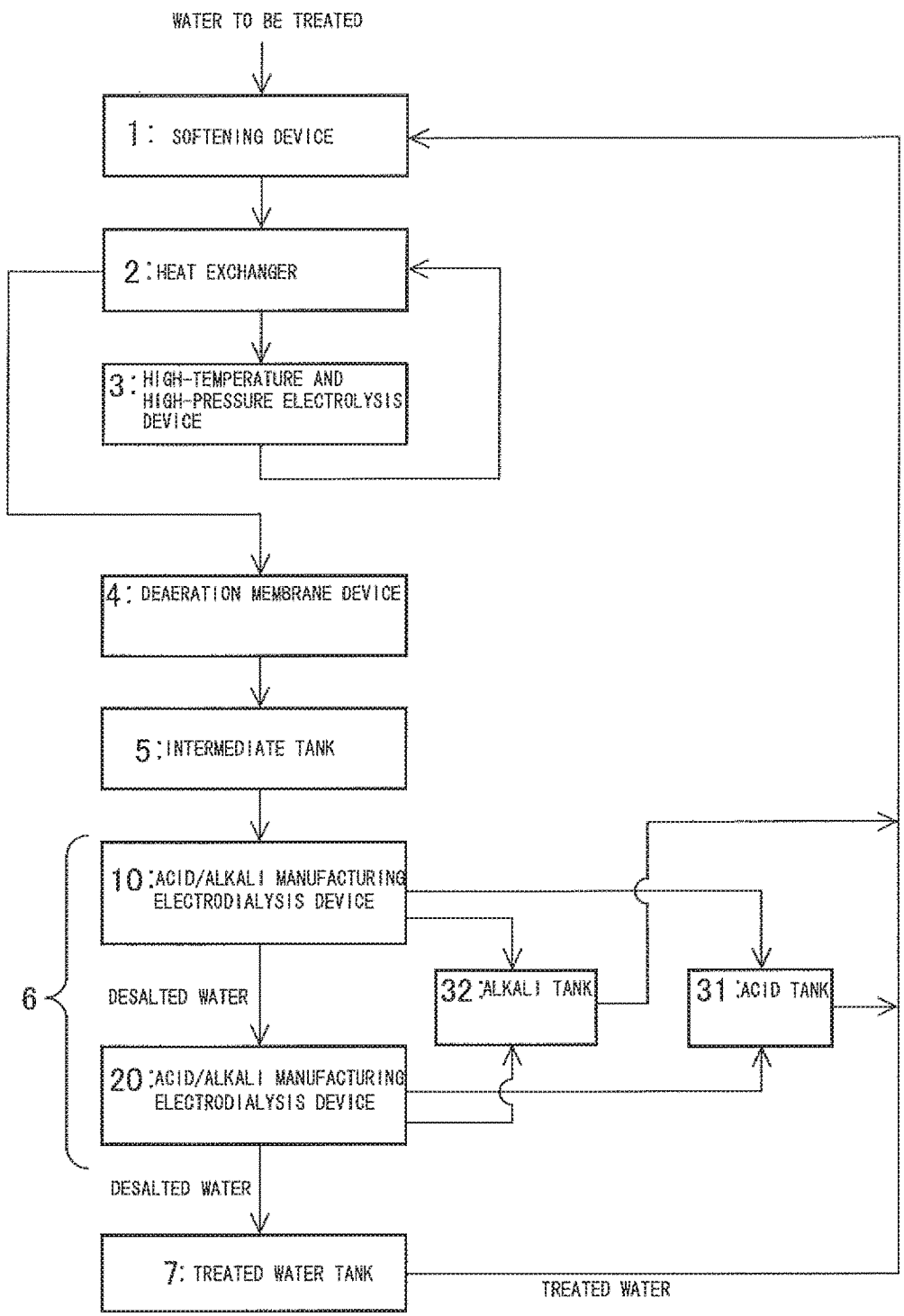
FIG. 1 is a systematic diagram showing one example of an embodiment of a water recovery apparatus of the present invention.

FIG. 1 is a systematic diagram showing one example of an embodiment of a water recovery apparatus of the present invention.

In this water recovery apparatus, as shown in FIG. 1, after wastewater containing scale components, organic substances, inorganic ions, and the like, which is water to be treated, such as wastewater generated in a closed system space, is first charged into a softening device 1 to remove hardness components in the wastewater, and softening treated water is pre-heated by heat exchange with electrolysis treated water by a heat exchanger 2, electrolysis is performed under high-temperature and high-pressure conditions by a high-temperature and high-pressure electrolysis device 3, so that oxidizable substances in the softening treated water are removed by the electrolysis. After the electrolysis treated water is processed by a deaeration treatment using a deaeration membrane device 4, deaeration treated water via an intermediate tank 5 is processed by a desalting treatment using an electrodialysis device 6 formed of acid/alkali manufacturing electrodialysis devices 10 and 20 provided in series at two stages, and desalted water is recovered in a treated water tank 7.

<Water to be Treated>

In the present invention, the water to be treated, that is, a treatment object, is wastewater containing scale components, organic substances, inorganic ions, and the like, and as the wastewater, for example, human effluent (such as urine and sweat) and living wastewater (air conditioner-related condensed water, kitchen wastewater, laundry wastewater, bath/shower wastewater, cleaning wastewater, and wastewater generated from breeding and cultivating animals, plants, and the like), each of which is generated in a closed system space, such as a nuclear shelter, a hazardous shelter, a space station or a moon-Mars manned spacecraft, or a lunar base, may be mentioned. In this case, the closed system space indicates a space in which substances and energy are restricted from being transported to and from the outside thereof, and in particular, as a closed system space to which the present invention is preferably applied, a shelter and a cosmic space, such as a space station or a spacecraft, may be mentioned. In particular, the present invention can be effectively applied to a manned environment in a cosmic space.

The wastewater discharged from those closed systematic spaces primarily includes air conditioner-related condensed water and/or sweat and urine discharged from human bodies and contains scale components, such as Mg and Ca, organic substances, such as proteins and urine, and inorganic ions, such as Na, K, Cl, $SO_4$, PO, $NH_3$, and NO.

As the water quality of the water to be treated, which is a treatment object, for example, although the following may be mentioned, mixed wastewater of the following types of wastewater may also be mentioned.

<Wastewater Primarily Formed of Sweat and Urine Discharged from Human Body> pH: 6 to 8
TOC: 2,000 to 15,000 mg/L
Inorganic ions: 5,000 to 20,000 mg/L
Na: 1,000 to 5,000 mg/L
$NH_4$: 100 to 1,500 mg/L
K: 500 to 2,500 mg/L
Cl: 2,000 to 10,000 mg/L
$PO_4$: 500 to 2,500 mg/L <Living Wastewater> pH: 5 to 13
TOC: 1 to 200 mg/L
Inorganic ions: 0.01 to 200 mg/L
Na: 0.01 to 10 mg/L
$NH_4$: 0.01 to 100 mg/L
K: 0.01 to 10 mg/L
Cl: 0.01 to 10 mg/L
$PO_4$: 0.01 to 10 mg/L Since urine and various types of living wastewater, each of which is generated in a closed system space, have different water qualities from each other, when water recovery is performed in accordance with the present invention, the treatment may be performed independently for each water species, if needed, or may be performed after those types of wastewater are mixed together in advance. In addition, during a treatment step, a specific type of water to be treated may also be added. Those treatment methods are preferably determined in consideration of the treatment efficiency.

In general, among the various types of water to be treated described above, since the scale components are most contained in urine, the removal of the hardness components by the softening device 1 may be performed only for urine as a treatment object, and in the high-temperature and high-pressure electrolysis device 3 in a subsequent step, the other types of water to be treated may be treated after being merged therewith. In the case as described above, the treatment can be efficiently performed without wastefully increasing the amount of water to be treated in each step.

<Softening Device>

In the present invention, first, the wastewater as described above is treated by the softening device 1, so that the hardness components are removed from the wastewater. For this softening treatment, a Na-type strong acid cation exchange resin or a weak acid cation exchange resin may be used, and the hardness components are removed by the following ion exchange reaction.

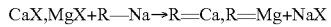

In this case, X represents an anion, and R represents an exchange group of the ion exchange resin.

In general, as the softening device 1, an ion exchange resin tower in which a Na-type strong acid cation exchange resin or a weak acid cation exchange resin is packed is used. Although the treatment conditions thereof are not particularly limited, in general, the treatment temperature is 20° C.

to 40° C., and the liquid passage SV (space velocity) is 0.1 to 100 hr$^{-1}$ and preferably 5 to 20 hr$^{-1}$.

By this softening device 1, since divalent scale components, such as Mg and Ca, in the water to be treated are removed, in the high-temperature and high-pressure electrolysis device 3 provided at a latter stage, the generation of scale is suppressed, and hence the current efficiently flows.

The softening device 1 can be regenerated by an acid solution and an alkali solution obtained by the acid/alkali manufacturing electrodialysis devices 10 and 20 of the electrodialysis device 6 provided at a latter stage. That is, the acid solution from the acid/alkali manufacturing electrodialysis devices 10 and 20 can be used as a regenerating agent of the Na-type strong acid cation exchange resin or the weak acid cation exchange resin of the softening device 1, and the alkali solution can be used as a Na-forming agent of the strong acid cation exchange resin or the weak acid cation exchange resin. Although not particularly limited, in general, the water passage SV in the regeneration is 0.1 to 50 hr$^{-1}$, such as 4.5 hr$^{-1}$.

<Heat Exchanger>

The softening treated water from the softening device 1 is pre-heated by heat exchange with the electrolysis treated water of the high-temperature and high-pressure electrolysis device 3 and is then charged into the high-temperature and high-pressure electrolysis device 3.

Since the temperature of the electrolysis treated water is generally 100° C. to 374° C. and is preferably high, such as approximately 200° C. to 250° C., when the high-temperature electrolysis treated water as described above is maintained under the high pressure conditions, and the softening treated water is pre-heated by heat exchange therewith, the thermal energy of the electrolysis treated water can be recovered, and the heating energy can be reduced. Hence, the problem of the increase in electric power consumption caused by the use of the high-temperature and high-pressure electrolysis device 3 can be suppressed.

By the heat exchange using the heat exchanger 2, softening treated water generally having a temperature of approximately 20° C. to 30° C. can be heated to approximately 180° C. to 220° C.

Between the heat exchanger 2 and the high-temperature and high-pressure electrolysis device 3, a back pressure valve is provided so that the pressure of the electrolysis treated water from the high-temperature and high-pressure electrolysis device 3 is adjusted.

<High-Temperature and High-Pressure Electrolysis Device>

Since the softening treated water pre-heated by the heat exchanger 2 is then electrolyzed by the high-temperature and high-pressure electrolysis device 3, oxidizable substances, such as organic substances, urine, and ammonia, contained in the wastewater are removed by the electrolysis. A concrete TOC concentration of the oxidizable substances contained in the wastewater is approximately 100 to 20,000 mg/L, and when urine is the treatment object, the concentration thereof is 1,000 to 10,000 mg/L and is, in general, approximately 5,000 to 7,000 mg/L.

As a reaction container applied to the high-temperature and high-pressure electrolysis device 3, the following is preferable.

Inside a cylindrical container (cylindrical pipe type container), such as a pipe having an inlet for the water to be treated at one end and an outlet for the electrolysis treated water at the other end, an anode is provided in a parallel direction to the flow of the water to be treated (softening treated water) so as to be isolated from the container for insulation therefrom, the pipe itself is used as a cathode, and a direct current power source is connected between the anode and the cathode. Since the cylindrical container is likely to maintain the strength against the inside pressure as compared to a container having another shape, such as a square tube shape, the thickness of the reaction container can be reduced, and hence, the reduction in size of the device can be performed. In addition, when the electrode is provided in parallel to the flow of the water to be treated, since generated air bubbles can be pushed out of the container together with the water to be treated, the adhesion of the air bubbles to the electrode is suppressed, and hence, the reaction efficiency can be increased.

As a structural material of the cathode (that is, the inside wall of the reaction container) of the high-temperature and high-pressure electrolysis device, for example, a nickel-based alloy, such as Hastelloy or Incoloy, or a steel material, such as carbon steel or stainless steel, may be used. In addition, a material coated with a metal, such as platinum, may also be used.

The cathode may also be formed of an electrically conductive diamond electrode, and when an electrically conductive diamond electrode is used, since the chemical stability is excellent, and the current efficiency is high, it is preferable in terms of electrolysis efficiency. In the case described above, there may also be used a cathode having a base formed of a metal, such as niobium, tungsten, stainless steel, molybdenum, platinum, or iridium, and a covering layer of electrically conductive diamond provided thereon.

The anode is preferably provided so that the distance between the anode and the inside wall of the reaction container functioning as the cathode is maintained constant. When this distance varies, it is not preferable since an excessive current flows locally at a portion at which the distance is small, and the degradation of the anode at this portion is promoted. In the present invention, it is preferable that in the cylindrical pipe type container, an anode having a flat plate shape, a round columnar shape, or a cylindrical shape is provided so that the central axis thereof substantially coincides with the central axis of the inside wall of the reaction container.

As the anode, although an anode formed of one flat plate or a plurality of flat plates may be provided as it is, a mesh or a net formed to have a cylindrical shape, a plate formed to have a cylindrical shape, or a bar-like body may also be used.

As the anode, at least the surface thereof is preferably formed of ruthenium, iridium, platinum, palladium, rhodium, tin, or an oxide thereof, or ferrite. The anode itself may be formed of one of those substances mentioned above, or the surface of the base material of the anode may be cover therewith.

Ruthenium, iridium, platinum, palladium, rhodium, or tin, each of which forms the anode, may represent either a metal element itself or an oxide thereof. In addition, an alloy of those metals is also preferably used. As the alloy, for example, platinum-iridium, ruthenium-tin, and ruthenium-titanium may be mentioned. The metals and the like mentioned above are excellent in corrosion resistance and show excellent insolubility when being used as the anode.

The anode may also be formed of an electrically conductive diamond electrode by the same reason as that for the cathode, and in this case, the anode may be entirely formed of electrically conductive diamond or may be formed by applying a covering layer of electrically conductive diamond on a base material formed of, for example, a metal, such as silicon, niobium, tungsten, stainless steel, molybdenum, platinum, or iridium, or a non-metal, such as silicon carbide, silicon nitride, molybdenum carbide, or tungsten carbide. Since the electrolysis of TOC occurs particularly at the anode, when an electrically conductive diamond electrode is used as the anode, TOC can be efficiently electrolyzed.

In the present invention, the high-temperature and high-pressure conditions indicates the conditions in which the pressure maintains a liquid phase of the water to be treated in a range of 100° C. to the critical temperature thereof, the temperature is generally 100° C. to 374° C. and preferably 200° C. to 250° C., and the pressure is generally 2 to 20 MPa and preferably 5 to 10 MPa. In particular, when the temperature in the electrolysis is 200° C. or more, the electrolysis efficiencies of proteins and urea are improved.

Although the electrolysis conditions under a high temperature and a high pressure are changed depending on the water quality of the water to be treated, the type of electrode to be used, the structure of the reaction container, and the like, a direct current to be supplied is generally 2 to 30 A and preferably approximately 5 to 20 A; the current density is 0.1 to 500 A/dm$^2$ and preferably 1 to 50 A/dm$^2$; and an electrolysis time is generally 0.5 to 30 hours and preferably 5 to 20 hours. Hence, in a one-pass type liquid passage reaction container in which electrolysis is performed by allowing the water to be treated to flow from one end side to the other end side of a cylindrical pipe type container, the flow rate is preferably adjusted so that the residence time of the water to be treated in the reaction container is the preferable electrolysis time described above.

A concrete linear velocity in the high-temperature and high-pressure electrolysis device is 0.1 to 50 m/hr and preferably 1 to 20 m/hr. In the case of electrolysis under low-temperature and low-pressure conditions, since air bubbles stay on the electrode, the linear velocity is required to be increased in order to remove the air bubbles; however, in the electrolysis under high-temperature and high-pressure conditions, since the generation of the air bubbles as described above is suppressed, the linear velocity is not required to be increased, and hence, the size of the device can be reduced.

By the electrolysis under high-temperature and high-pressure conditions as described above, although organic substances, urea, and ammonia, and the like are electrolyzed by the following reactions, in this case, since the electrolysis is performed under high-temperature and high-pressure conditions in the present invention, the generation of an oxygen gas and a hydrogen gas during the electrolysis is suppressed, and in addition, the generation of oxide substances, such as perchloric acid, can also be suppressed. In addition, when the conditions are set so that water is generated from oxygen and hydrogen, the water recovery rate can be improved.

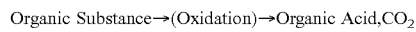

Organic Substance→(Oxidation)→Organic Acid,$CO_2$

Urea→$NH_4^+$+$CO_3^{2-}$

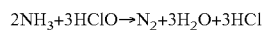

$2NH_3+3HClO \rightarrow N_2+3H_2O+3HCl$

By the use of hypochlorous acid, organic substances, such as proteins, and urea can be electrolyzed and changed into ions of organic acids, ammonia, and the like, each of which can be removed by the electrodialysis device 6 provided at a latter stage. As described above, according to the present invention, in the high-temperature and high-pressure electrolysis device 3, urea which cannot be removed by the electrodialysis device 6 provided at a latter stage can be removed into ammonia and carbonic acid by the electrolysis under high-temperature and high-pressure conditions. In addition, in the above reaction formulas, HClO is generated from an electrolysis reaction ($2Cl^-+H_2O \rightarrow HClO+HCl+2e^-$) of chlorine ions contained in the water to be treated (wastewater).

In general electrolysis, although inorganic ions are oxidized, and $ClO_3$ and perchloric acids, such as $ClO_4$, are generated, in the present invention, by the treatment performed under the high-temperature and high-pressure conditions, the generation of those oxide substances is suppressed, and the generation of $ClO_3$ and perchloric acids, such as $ClO_4$, which are the loads on the electrodialysis device 6 provided at a latter stage can be further suppressed. Hence, unlike the case of the above Patent Literature 3, a catalyst decomposition device for decomposition of the perchloric acids and the like mentioned above is not required to be installed at a latter stage of the high-temperature and high-pressure electrolysis device 3, and the electrolysis treated water can be directly supplied to the electrodialysis device 6 without passing through the other water treatment means.

As for the increase in pressure of the water to be treated in the high-temperature and high-pressure electrolysis device 3, although the increase in pressure using a gas or the like may be considered, since the facility and the space are limited in a closed system space, when the pressure is increased to a predetermined pressure using a pump, the reduction in size of the device and the reduction in space can be achieved. In this case, the pressure during the electrolysis can be controlled by adjusting a high pressure pump which supplies the water to be treated by the increase in pressure thereof to the high-temperature and high-pressure electrolysis device 3 and a back pressure valve provided at a treated-water outlet of the high-temperature and high-pressure electrolysis device 3.

In the present invention, since the facility cost and the electric power consumption can be reduced as compared to the case of a circulation type, the high-temperature and high-pressure electrolysis device 3 is preferably a one-pass type in which the water to be treated is treated once through the device. That is, in the circulation type, when the circulation is performed while a high pressure is maintained, a tank is required to satisfy a high-pressure specification, and in addition, when the circulation is performed while the pressure is open to the air, the increase in pressure is required to be repeatedly performed, and the electric power consumption of a liquid passage pump is excessively increased; however, in the case of the one-pass type, the problems described above may not occur. In addition, in the case of the one-pass type, the liquid velocity can be decreased as compared to that of the circulation type. Hence, since the residence time in the deaeration membrane device 4 can be easily secured, the size of the deaeration membrane device 4 provided at a latter stage can be reduced.

The circulation type device indicates a device operated by a method in which outflow water from the device is returned to an inlet side thereof and is again treated, and the one-pass type device indicates a device in which outflow water from the device is supplied to a device provided at a latter stage without returning the outflow water to the device itself and an upstream side thereof. In both the devices operated by the methods described above, a tank may be provided between the devices, or the liquid supply may be performed through a pipe.

The high-temperature and high-pressure electrolysis device 3 may be installed by connecting a plurality of the cylindrical pipe type reaction containers described above in series or may be installed by arranging a plurality of reaction container groups each connecting a plurality of reaction containers in series, and since the reaction containers are provided as described above, the amount of the water to be treated of the high-temperature and high-pressure electrolysis device 3 and the electrolysis amount of organic substances and the like can be increased. In addition, when the current condition of each reaction container is optimized in accordance with the organic substance concentration at the inlet of each reaction container, the improvement in current efficiency and the reduction in application voltage can be performed, and the electric power consumption can be reduced.

<Deaeration Membrane Device>

As described above, in the high-temperature and high-pressure electrolysis device 3, a hydrogen gas derived from the electrolysis of water and gases, such as carbon dioxide, derived from the electrolysis of organic substances are generated.

In the water recovery apparatus shown in FIG. 1, since the electrolysis treated water from the high-temperature and high-pressure electrolysis device 3 is processed by the deaeration treatment using the deaeration membrane device 4, gases in the electrolysis treated water can be removed.

As a deaeration means of the electrolysis treated water, instead of the deaeration membrane device, for example, although a centrifugal device may also be used, the deaeration membrane device 4 is preferably used since being compact and excellent in deaeration efficiency.

Between the high-temperature and high-pressure electrolysis device 3 and the deaeration membrane device 4, a back pressure valve is provided, and the pressure of the electrolysis treated water is adjusted.

Deaeration treated water from the deaeration membrane device 4 is stored in the intermediate tank 5. By the intermediate tank 5 thus provided, since the high-temperature and high-pressure electrolysis device 3 and the electrodialysis device 6 provided at a latter stage are not required to be operated at the same time, the maximum electric power consumption can be suppressed, and/or the operation can be performed so as to correspond to a different treatment flow rate.

<Electrodialysis Device>

The deaeration treated water of the electrolysis treated water is then processed by a desalting treatment using the electrodialysis device 6.

In the water recovery apparatus shown in FIG. 1, as the electrodialysis device 6, the acid/alkali manufacturing electrodialysis devices 10 and 20 are used, and desalted water obtained by the acid/alkali manufacturing electrodialysis device 10 at an upstream side is further processed by a desalting treatment using the acid/alkali manufacturing electrodialysis device 20 at a downstream side, so that treated water (product water) is obtained.

The electrodialysis device used in the present invention may be formed of a plurality of acid/alkali manufacturing electrodialysis devices connected in series at three stages or more.

Hereinafter, the acid/alkali manufacturing electrodialysis device 10 at an upstream side is called "first electrodialysis device", and the acid/alkali manufacturing electrodialysis device 20 at a downstream side is called "second electrodialysis device".

Figure 5:
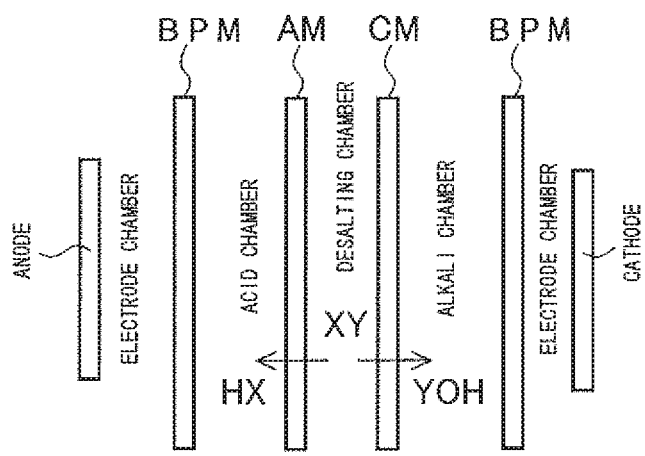
FIG. 5 is a schematic cross-sectional view illustrating the structure of a general acid/alkali manufacturing electrodialysis device and ion movements.

In the first electrodialysis device 10 and the second electrodialysis device 20, as shown in FIG. 5, between an anode and a cathode, repeating units including an acid chamber, an anion exchange membrane AM, a desalting chamber, a cation exchange membrane CM, an alkali chamber, - - - - - are provided with an electrode chamber and a bipolar membrane BPM which are provide at each side so that the acid chamber is provided at an anode side, and the alkali chamber is provided at a cathode side. In addition, as shown in FIG. 5, an anion $X^-$ and a cation $Y^+$ in the water to be treated are moved into the acid chamber and the alkali chamber through the anion membrane AM and the cation membrane CM, respectively, so that desalted water is obtained from the desalting chamber, and at the same time, an acid solution and an alkali solution are obtained from the acid chamber and the alkali chamber, respectively.

Hereinafter, with reference to FIG. 2, the flow of water in the first electrodialysis device 10 and the second electrodialysis device 20 will be described.

The deaeration treated water of the electrolysis treated water from the intermediate tank 5 is processed by a desalting treatment after being charged into the desalting chamber of the first electrodialysis device 10 through pipes 41 and 42, desalting treated water is further processed by a desalting treatment after being charged into the desalting chamber of the second electrodialysis device 20 through a pipe 43, and the desalting treated water is supplied to the treated water tank 7 through a pipe 44.

The deaeration treated water from the pipe 41 is partially supplied to the acid chamber and the alkali chamber of the second electrodialysis device 20 through pipes 45 and 46 and is then supplied to an acid tank 31 and an alkali tank 32 through pipes 47 and 48, respectively. An acid solution from the acid tank 31 and an alkali solution from the alkali tank 32 are supplied to the acid chamber and the alkali chamber of the first electrodialysis device 10 through pipes 49 and 50, respectively, and are then circulated to the acid tank 31 and the alkali tank 32 through pipes 51 and 52, respectively.

Two types of electrode water (anode water of the electrode chamber (anode chamber) at an anode side and cathode water of the electrode chamber (cathode chamber) at a cathode side) of the first electrodialysis device 10 and the second electrodialysis device 20 are configured so as to be circulated from the electrode chamber at an anode side and the electrode chamber at a cathode side of the first electrodialysis device 10 to pipes 59 and 60 through pipes 53 and 54, deaeration membrane devices 71 and 72, pipes 55 and 56, electrode water tanks 73 and 74, pipes 57 and 58, and the electrode chamber at an anode side and the electrode chamber at a cathode side of the second electrodialysis device 20, respectively.

The pipe 44 which allows the desalted water as the treated water from the second electrodialysis device 20 to pass therethrough has a branch pipe 61, and desalted water having a low water quality obtained at an initial operation stage is returned to the pipe 41 so as to be again processed by the desalting treatment.

The acid solution in the acid tank 31 and the alkali solution in the alkali tank 32 are transported to the softening device 1 through pipes 62 and 63, respectively, and a pipe 64 and are used as regenerating agents of the ion exchange resins of the softening device 1. In addition, the treated water in a treated water tank 7 is transported to the softening device 1 as rinsing water for the regenerating agent through a pipe 65 and the pipe 64. The acid solution in the acid tank 31 and the alkali solution in the alkali tank 32 each may be transported to the softening device 1 as mixed water with the treated water.

The treated water from the treated water tank is transported to the electrode water tanks 73 and 74 as makeup water trough the pipe 65, a pipe 66, and pipes 67 and 68, respectively.

Although the treatment conditions of the electrodialysis treatments of the first electrodialysis device 10 and the second electrodialysis device 20 are not particularly limited, it is preferable that the current density is set to 0.1 to 10 A/dm$^2$, the treatment temperature is set to 20° C. to 40° C., the pressure is set to 0 to 0.1 MPa, the flow velocity is set to approximately 50 to 100 m/hr, and the flow rate is set to approximately 1 to 100 mL/min although being changed depending on the size of the device.

As described above, when the acid/alkali manufacturing electrodialysis devices are connected in series at two stages or more, and when the one-pass type water passage treatment is performed in each device so that the desalted water by the acid/alkali manufacturing electrodialysis device at an upstream side is further processed by a desalting treatment using the acid/alkali manufacturing electrodialysis device at a downstream side, from the acid/alkali manufacturing electrodialysis device at a downstream side, treated water having a high water quality can be obtained.

When the circulation type treatment is performed by the electrodialysis device instead of the one-pass type treatment, at a latter stage of the treatment, since the difference in concentration between the desalted water and the acid and the alkali solutions is increased, and the desalting efficiency is seriously degraded, as is the case of Reference Example 2 which will be described later, the water quality of the treated water, the electric power consumption, and the water recovery rate are all degraded.

Figure 2:
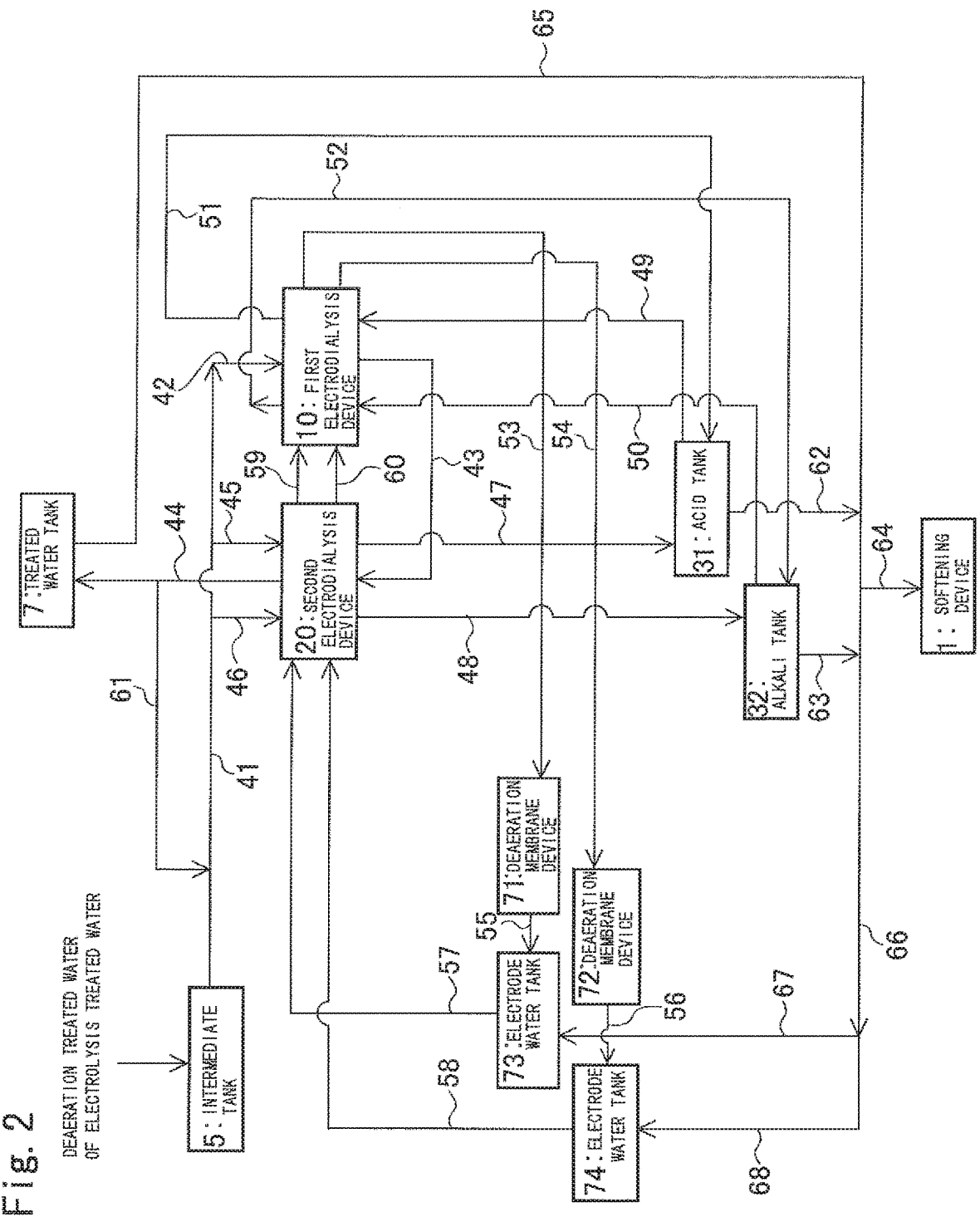
FIG. 2 is a systematic diagram showing one example of an embodiment of an electrodialysis device of the present invention.

In this case, as shown in FIG. 2, when the deaeration treated water of the electrolysis treated water, which is the water to be treated, is allowed to pass through the acid chamber and the alkali chamber of the second electrodialysis device 20 at a downstream side, and the acid solution and the alkali solution from the acid chamber and the alkali chamber of the second electrodialysis device 20 are allowed to pass through the acid chamber and the alkali chamber of the first electrodialysis device 10 at an upstream side via the acid tank 31 and the alkali tank 32, respectively, clean water having a low ion concentration as compared to that of water which is allowed to pass through the acid chamber and the alkali chamber of the first electrodialysis device 10 at an upstream side is allowed to pass through the acid chamber and the alkali chamber adjacent to the desalting chamber of the second electrodialysis device 20 at a downstream side, and in the desalting chamber of the second electrodialysis device 20 at a downstream side, a higher desalting treatment can be performed. In addition, when the acid chamber and the alkali chamber of the first electrodialysis device 10 at an upstream side, the acid tank 31, and the alkali tank 32 are configured so that the acid solution and the alkali solution are each circulated therethrough, a more concentrated acid solution and a more concentrated alkali solution can be obtained by the first electrodialysis device 10 at an upstream side, and by the use of those highly concentrated acid and alkali solutions, the softening device 1 can be efficiency processed by a regeneration treatment. In each dialysis cell, since the difference in concentration between the desalted water and the acid and the alkali solutions is decreased, the influence of the concentration diffusion of ions is decreased, and the desalting efficiency is improved. As a result, since the electric power consumption is reduced, and the osmotic pressure is decreased, the movement of water from the desalting chamber to the acid and the alkali chambers is suppressed, and the water recovery rate is improved.

Although the electrodialysis device shown in FIG. 2 is configured so that the acid solution and the alkali solution from the second electrodialysis device 20 are transported to the acid tank 31 and the alkali tank 32, respectively, and the acid solution and the alkali solution in the acid tank 31 and the alkali tank 32 are transported to the acid chamber and the alkali chamber of the first electrodialysis device 10, respectively, the acid solution and the alkali solution from the second electrodialysis device 20 may be directly transported to the acid chamber and the alkali chamber, respectively, of the first electrodialysis device 10 without passing through the acid tank 31 and the alkali tank 32.

Through the acid chamber and the alkali chamber of the second electrodialysis device 20 at a downstream side, water having a low ion concentration as compared to that of water which is allowed to pass through the acid chamber and the alkali chamber of the first electrodialysis device 10 at an upstream side may be allowed to pass, and besides the water to be treated (deaeration treated water of the electrolysis treated water), purified water may also be supplied from the outside of the system and allowed to pass, or an acid solution and an alkali solution, each of which is diluted with the water to be treated or purified water, may also be allowed to pass.

In the electrodialysis device shown in FIG. 2, the two types of electrode water (the anode water from the electrode chamber (anode chamber) at an anode side and the cathode water from the electrode chamber (cathode chamber) at a cathode side) from the electrode chambers of the first electrodialysis device 10 and the second electrodialysis device 20 are processed by a deaeration treatment using the deaeration membrane devices 71 and 72 and are then circulated to the first electrodialysis device 10 and the second electrodialysis device 20, respectively. As described above, since the electrode water is processed by the deaeration treatment, the increase in electric resistance and the increase in voltage, each of which is caused by the generation of gases in the first electrodialysis device 10 and the second electrodialysis device 20, can be prevented, and the current efficiency can be increased. That is, in the acid/alkali manufacturing electrodialysis device, by the electrolysis of water, hydrogen is generated at the cathode, and oxygen and hydrogen are generated at the anode. Although the gases thus generated function as the resistance of the electrodialysis, in the electrodialysis device shown in FIG. 2, this gas can be removed by the deaeration membrane devices 71 and 72. In addition, when the anode water and the cathode water are separately processed by the deaeration treatment, oxygen generated in the electrode chamber at an anode side is recovered in the deaeration membrane device and can be used as cabin air in a closed system space.

As the deaeration means of the electrode water, although a centrifugal device or a catalyst device may also be used instead of using the deaeration membrane device, since the deaeration membrane device is compact and excellent in deaeration efficiency, and deaerated oxygen can be easily recovered and used, the deaeration membrane device is preferably used.

In the electrode chambers of the acid/alkali manufacturing electrodialysis device, when the operation is continued, pH of the electrode chamber (anode chamber) at an anode side is decreased, and pH of the electrode chamber (cathode chamber) at a cathode side is increased. When the pH of the anode chamber is decreased, since a chlorine gas is liable to be generated, the adjustment of pH is required. In general, as the anode water, although a sodium sulfate aqueous solution or the like is used, as the anode water, when a sodium phosphate aqueous solution having a pH buffering function or an aqueous solution containing glycine and sodium hydroxide is used, the decrease in pH can be suppressed. As another pH adjustment means, in the case in which sodium sulfate is used, for example, a method may be mentioned in which after flow paths of the cathode chamber and the anode chamber are switched therebetween, water flow is performed.

In the case in which a chlorine gas is mixed in the anode chamber of the acid/alkali manufacturing electrodialysis device through the bipolar membrane, a chamber (in the present invention, this chamber is called "buffer chamber") formed and defined by 2 bipolar membranes is provided adjacent to the anode chamber, and the water to be treated is first allowed to pass through the buffer chamber of the acid/alkali manufacturing electrodialysis device at a downstream side, is then allowed to pass through the buffer chamber of the acid/alkali manufacturing electrodialysis device at an upstream side, and is further sequentially allowed to pass through the desalting chamber of the acid/alkali manufacturing electrodialysis device at an upstream side and the desalting chamber of the acid/alkali manufacturing electrodialysis device at a downstream side for the desalting treatment, so that chlorine ions are removed, and the generation of a chlorine gas in the anode chamber can be prevented.

Hereinafter, the desalting treatment by the acid/alkali manufacturing electrodialysis device having the buffer chamber will be described with reference to FIG. 3.

Figure 3:
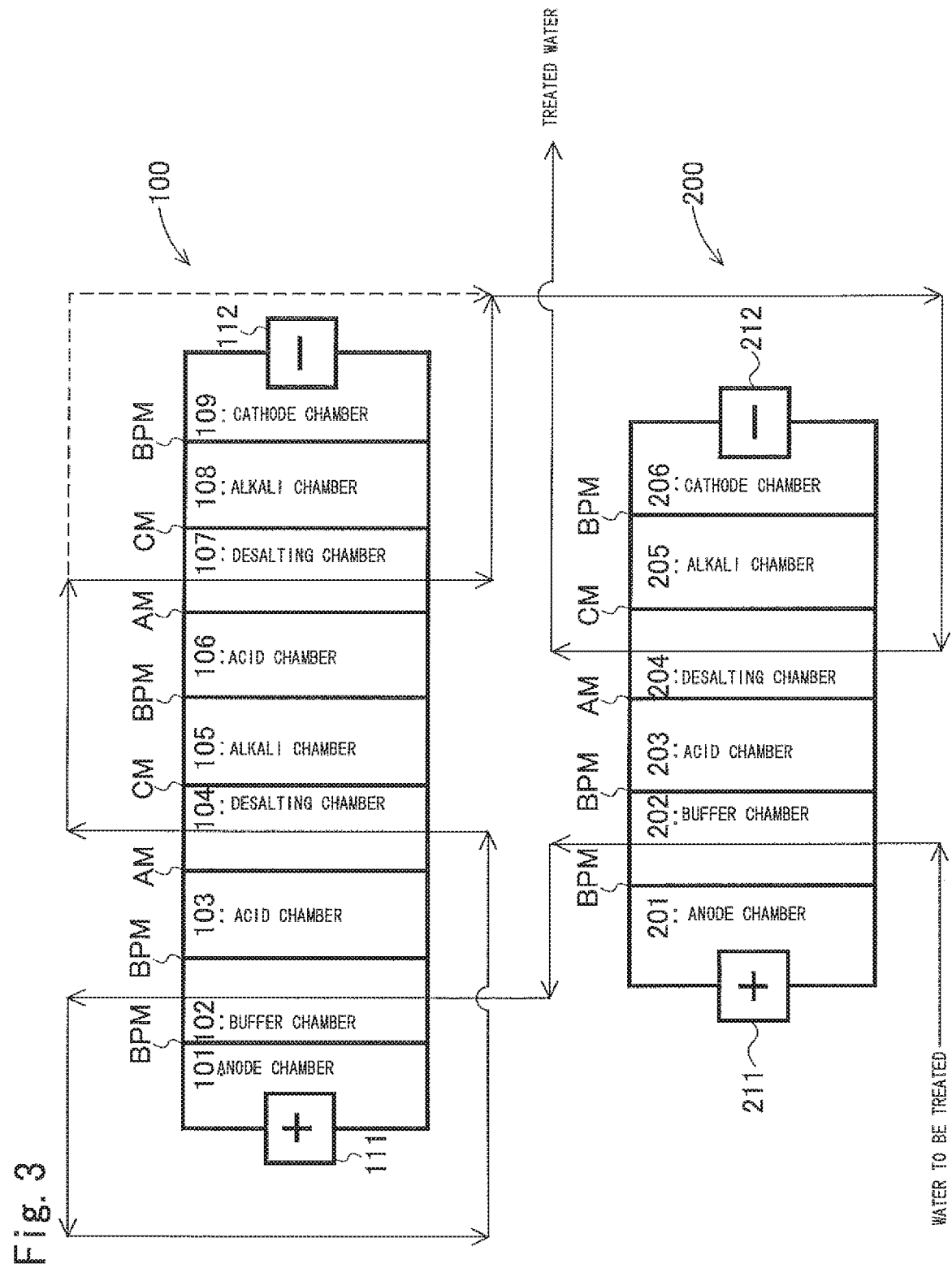
FIG. 3 is a systematic diagram showing another example of the embodiment of the electrodialysis device of the present invention.
Figure 4:
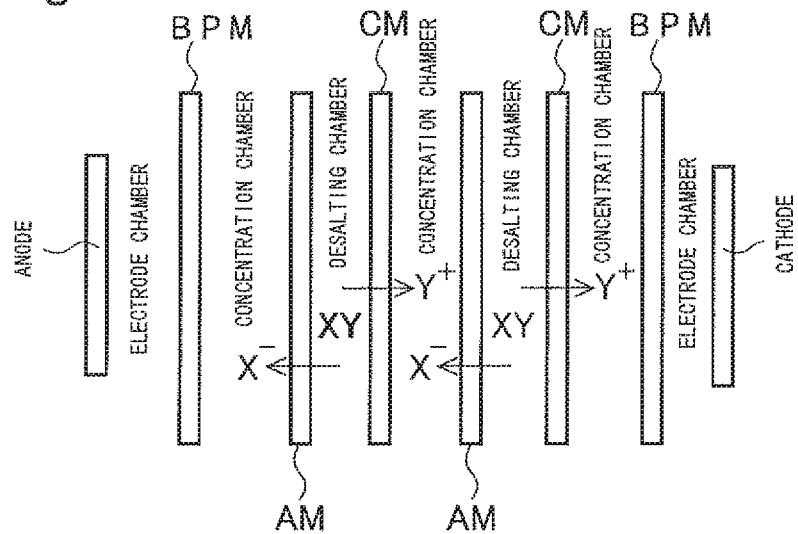
FIG. 4 is a schematic cross-sectional view illustrating the structure of a general desalting electrodialysis device and ion movements.

In FIG. 3, as an acid/alkali manufacturing electrodialysis device 100 provided at a first stage, a device is used in which between an anode 111 and a cathode 112, an anode chamber 101, a bipolar membrane BPM, a buffer chamber 102, a bipolar membrane BPM, an acid chamber 103, an anion exchange membrane AM, a desalting chamber 104, a cation exchange membrane CM, an alkali chamber 105, a bipolar membrane BPM, an acid chamber 106, an anion exchange membrane AM, a desalting chamber 107, a cation exchange membrane CM, an alkali chamber 108, a bipolar membrane BPM, and a cathode chamber 109 are disposed in this order; as a second acid/alkali manufacturing electrodialysis device 200, a device is used in which between an anode 211 and a cathode 212, an anode chamber 201, a bipolar membrane BPM, a buffer chamber 202, a bipolar membrane BPM, an acid chamber 203, an anion exchange membrane AM, a desalting chamber 204, a cation exchange membrane CM, an alkali chamber 205, a bipolar membrane BPM, and a cathode chamber 206 are disposed in this order; and those acid/alkali manufacturing electrodialysis devices are connected in series.

The acid/alkali manufacturing electrodialysis device having a buffer chamber is a device in which between an anode chamber, a bipolar membrane BPM, and a buffer chamber and a cathode chamber and a bipolar membrane BPM, repeating units each including a bipolar membrane BPM, an acid chamber, an anion exchange membrane AM, a desalting chamber, a cation exchange membrane CM, and an alkali chamber are provided so that the acid chamber is located at a buffer chamber side and the alkali chamber is located at a cathode side, and the number of the repeating units is not particularly limited.

In the electrodialysis device shown in FIG. 3, after water to be treated (such as the deaeration treated water of the electrolysis treated water shown in FIG. 1) is first allowed to pass through the buffer chamber 202 of the second acid/alkali manufacturing electrodialysis device 200 at a downstream side and is then allowed to pass through the buffer chamber 102 of the first acid/alkali manufacturing electrodialysis device 100 at an upstream side so that chlorine ions (Cl⁻) are recovered from the acid chambers 203 and 103 adjacent thereto, respectively, the water thus processed is allowed to pass through the desalting chamber 104 close to the buffer chamber 102 at an upstream side and is then further allowed to pass through the desalting chamber 107 in a direction opposite to that in the desalting chamber 104. The desalted water obtained by the desalting treatment in the desalting chambers 104 and 107 is allowed to pass through the desalting chamber 204 of the second acid/alkali manufacturing electrodialysis device 200 and is recovered from this desalting chamber 204 as the treated water.

As described above, when the buffer chamber is formed between the anode chamber and the acid chamber and is defined by the bipolar membranes BPM, and chlorine ions from the acid chamber are recovered in this buffer chamber and are then processed by a desalting treatment in the desalting chamber, the water quality of the treated water is improved, and the generation of a chlorine gas in the acid chamber and the anode chamber can also be prevented, so that the anode can be prevented from being degraded by chlorine.

In the case described above, in order to highly remove chlorine ions in the acid chamber at a downstream side and to improved the water quality of the desalted water of the desalting chamber at a downstream side, the water to be treated is preferably allowed to pass through the buffer chamber at a downstream side and the buffer chamber at an upstream side in this order.

In the electrodialysis device shown in FIG. 3, as shown in FIG. 2, the electrode water is also preferably processed by the deaeration treatment and then circulated. In addition, the acid solution and the alkali solution are also preferably circulated as is the case of the electrodialysis device shown in FIG. 2.

In the electrodialysis device shown in FIG. 3, the desalted water from the desalting chamber 104 of the first acid/alkali manufacturing electrodialysis device 100 may be allowed to pass through the desalting chamber 204 of the second acid/alkali manufacturing electrodialysis device 200 as shown by a dotted line of FIG. 3 without being allowed to pass through the desalting chamber 107.

As described above, when the acid/alkali manufacturing electrodialysis devices each having the buffer chamber are used, the increase in chlorine concentration in the acid chamber and the anode chamber during continuous operation is suppressed, and the degradation in water quality of the treated water is prevented, so that treated water having a high water quality can be stably obtained.

Although the electrodialysis devices shown in FIGS. 2 and 3 are each preferable as the electrodialysis device of the water recovery apparatus of the present invention, the electrodialysis device of the present invention as described above may be applied to not only to an electrodialysis device of the water recovery apparatus of the present invention but also applied to an electrodialysis device itself, and in addition, the electrodialysis device of the present invention may also be used as a device treating various types of wastewater and service water by providing necessary devices at a former stage and/or a latter stage.

Heretofore, as the electrodialysis device 6 of the water recovery apparatus of the present invention, although a device in which the acid/alkali manufacturing electrodialysis devices 10 and 20 are connected in series at two stages is described by way of example, the electrodialysis device used for the water recovery apparatus of the present invention may also be a device in which the acid/alkali manufacturing electrodialysis devices are connected in series at three stages or more.

The electrodialysis device is not limited to a device in which acid/alkali manufacturing electrodialysis devices are provided at two stages or more and may be an electrodialysis device as described in the prior application which is configured so that a desalting electrodialysis device and an acid/alkali manufacturing electrodialysis device are provided in series, and by treating deaeration treated water of electrolysis treated water using the desalting electrodialysis device, product water formed of desalted water from which ions are removed and a salt concentrated liquid are obtained; the salt concentrated liquid obtained by the desalting electrodialysis device is treated by the acid/alkali manufacturing electrodialysis device to obtain desalted water, an acid solution, and an alkali solution; the acid solution and the alkali solution obtained by the acid/alkali manufacturing electrodialysis device is used for regeneration of a softening device; and the desalted water obtained by the acid/alkali manufacturing electrodialysis device is partially or entirely returned to an inlet side of the desalting electrodialysis device and is treated by this desalting electrodialysis device together with the deaeration treated water of the electrolysis treated water.

The electrodialysis device may be formed using only the desalting electrodialysis device. In this case, a non-regeneration type ion exchange device is used as the softening device, so that no regeneration using an acid and an alkali may be performed. As the mode of the non-regeneration type ion exchange device, there are roughly two types, that is, the type in which an ion exchange resin itself is taken out of a container and is changed and the type in which a column itself is changed may be mentioned. When the desalting electrodialysis device is provided, the acid tank and the alkali tank shown in FIG. 2 are not required, and a circulation tank of concentrated water from the concentration chamber is provided.

However, when the acid/alkali manufacturing electrodialysis device is used, since there is an advantage in that no tanks are required between the acid/alkali manufacturing electrodialysis devices, in the water recovery apparatus of the present invention, an electrodialysis device in which acid/alkali manufacturing electrodialysis devices are provided at two stages is preferably used.

EXAMPLES

Hereinafter, with reference to examples and comparative examples, the present invention will be described in more detail.

Example 1

By the use of the water recovery apparatus shown in FIGS. 1 and 2, 1 L of raw water having the water quality shown in Table 1 was treated.
[Device Specification]
The specification of each device is as follows.
<Softening Device>
  Weak cationic exchange resin tower
  Resin amount: 20 ml
  Liquid passage SV: 10 $hr^{-1}$
  Temperature: 25° C.
<Heat Exchanger>
  Softening treated water at a temperature of 25° C. was pre-heated to 200° C. by heat exchange with electrolysis treated water at a temperature of 250° C. (heating from 200° C. to 250° C. was performed using a heater).
<High-Temperature and High-Pressure Electrolysis Device>
  Cell: A cylindrical pipe-type reaction container having an inlet for water to be treated at one end and an outlet for treated water at the other end (outside diameter: 12.7 mm, wall thickness: 1 mm, length: 350 mm)×3 machines
  Anode: An iridium oxide electrode provided concentrically around the center of the reaction container
  Cathode: An electrically conductive titanium pipe also functioning as an inside wall of the reaction container
  Bipolar electrode: A plate-like electrically conductive diamond electrode disposed in parallel to the anode
  Effective electrode area: 0.65 $dm^2$/cell
  Flow rate: 1.7 mL/min (linear velocity: 2.7 m/hr)
  Input current: 1.3 A
  Temperature: 250° C.
  Pressure: 7 MPa
  Treatment time: 10 hours
<Deaeration Membrane Device>
  "G420" manufactured by Polypore
<Electrodialysis Device>
  Acid/alkali manufacturing electrodialysis device: Acilyzer S3 (partially improved) manufactured by Astom Corp., 2 machines
  Effective membrane area: 0.52 $dm^2$/chamber
  Current: First electrodialysis device=1.6 A
  Second electrodialysis device=0.4 A
  Current density:
  First electrodialysis device=3.1 $A/dm^2$
  Second electrodialysis device=0.8 $A/dm^2$
  Flow method: 2 machines connected in series, and one-pass type
  Pressure: 0.1 MPa
  Flow rate: 3.4 mL/min
  Electrode liquid: $Na_2SO_4$ aqueous solution at 0.25 mol/L
[Treatment Results]
The treatment results of each device are as shown below.
<Softening Device>
  Scale Component
  Mg<1 mg/L
  Ca<1 mg/L
<High-Temperature and High-Pressure Electrolysis Device>
  TOC of treated water: <3 mg/L
  Gas amount of treated water: 2.7 L/h
  Electric power consumption: 254 Wh/L
  Water loss amount: 1.5%
<Deaeration Membrane Device>
  Gas amount of deaeration treated water: 0 L/h (deaeration rate: 99.99% or more)
<Electrodialysis Device>
  Electrical conductivity of treated water: 0.8 mS/m
  Electric power consumption: 210 Wh/L
  Water loss amount: 10%

The water quality of the obtained treated water is shown in Table 1.

TABLE 1

| | pH | TOC (mg/L) | Na | NH$_4$ | K | Mg | Ca | Cl | NO$_3$ | SO$_4$ | PO$_4$ |
|---|---|---|---|---|---|---|---|---|---|---|---|
| | | | | | | Inorganic Ions (mg/L) | | | | | |
| Raw Water | 6.5 | 5989 | 3150 | 572 | 2428 | 81 | 260 | 5645 | 586 | 2076 | 124 |
| Treated Water | 7 | <3 | <1 | <0.1 | <1 | <1 | <1 | <1 | <1 | <1 | <1 |
| Tap Water Standard | 5.8-8.6 | <3 | <200 | — | — | <300 *1) | <300 *1) | <200 | <10 *2) | — | — |
| Evaluation | Good | Good | Good | Good | Good | Good | Good | Good | Good | Good | Good |

*1) With Respect to Calcium, Magnesium Ions, and the Like (Hardness)
*2) With Respect to Nitrate Nitrogen and Nitrite Nitrogen Comparative Example 1

In Example 1, except that the treatment conditions of the electrolysis device were set as described below, when a treatment similar to that described above was performed, although the oxygen concentration of the high-temperature and high-pressure electrolysis treated water in Example 1 was approximately 1%, the oxygen concentration of normal-temperature and normal-pressure electrolysis treated water was 26.7%. Since the oxygen explosion concentration range in the presence of hydrogen is 5 to 96%, there was an explosion risk under the following normal-temperature and normal-pressure electrolysis conditions, and hence, in order to prevent the explosion, a gas generated by the electrolysis was diluted with a nitrogen gas. In this case, the flow rate of a nitrogen gas was set to 3 L/min.

<Electrolysis Device>

Cell: A cylindrical pipe-type reaction container having an inlet for water to be treated at one end and an outlet for treated water at the other end (outside diameter: 12.7 mm, wall thickness: 1 mm, length: 350 mm)×3 machines Anode: An iridium oxide electrode provided concentrically around the center of the reaction container Cathode: An electrically conductive titanium pipe also functioning as an inside wall of the reaction container Bipolar electrode: A plate-like electrically conductive diamond electrode disposed in parallel to the anode Effective electrode area: 0.65 dm$^2$/cell Flow rate: 10 mL/min Input current: 1.3 A Temperature: 50° C.

Pressure: atmospheric pressure

Treatment time: 17 hours

Flow rate of nitrogen gas: 3 L/min

As a result, the treatment results of the electrolysis device are as shown below, and as the electric power consumption was increased, the water loss amount was increased, and the water recovery rate was low.

TOC of treated water: <3 mg/L

Electric power consumption: 724 Wh/L

Water loss amount: 21.1%

Reference Example 1

In Example 1, except that as the electrolysis device, a circulation type was used instead of using the one-pass type, and the electrolysis treated water was partially circulated to an inlet side of the electrolysis device, a treatment similar to that described above was performed. In this case, the flow rate of the electrolysis device was 10 mL/min, and the treatment time was 14 hours. The other conditions were the same as those in Example 1.

As a result, the treatment results of the electrolysis device are as shown below, and the electric power consumption was slightly increased.

TOC of treated water: <3 mg/L

Electric power consumption: 350 Wh/L

Water loss amount: 1.5%

Reference Example 2

In Example 1, except that in the first electrodialysis device and the second electrodialysis device of the electrodialysis device, a circulation treatment was performed instead of the one-pass type, and desalted water of the second electrodialysis device was partially processed by a circulation treatment using the first electrodialysis device, a treatment similar to that described above was performed. In this case, the flow rate of the electrodialysis device was 20 mL/min. The other conditions were the same as those in Example 1.

As a result, the treatment results of the electrodialysis device are as shown below, and the water quality of the treated water, the electric power consumption, and the water loss amount were all degraded.

Electrical conductivity of treated water: 2.0 mS/m

Electric power consumption: 350 Whr/L

Water loss amount: 17.3%

INDUSTRIAL APPLICABILITY

As has thus been described, according to the water recovery apparatus and the electrodialysis device of the present invention, since living wastewater and human effluent can be reused after impurities are removed therefrom by a small and simple structural device, in particular, the present invention can be preferably applied to a life maintenance device of a space station.

Although the present invention has been described in detail with reference to the specific aspects, it is apparent to a person skilled in the art that various modifications may be performed without departing from the spirit and the scope of the present invention.

In addition, this application claims the benefit of Japanese Patent Application No. 2014-227198 filed Nov. 7, 2014, which is hereby incorporated by reference herein in its entirety.

The invention claimed is:

1. A water recovery apparatus which treats wastewater and recovers treated water as product water, the water recovery apparatus comprising:

a softening device removing a hardness component in the wastewater;

a high-temperature and high-pressure electrolysis device in which softening treated water in the softening device is electrolyzed by supplying a direct current at a temperature of 100° C. to the critical temperature of the softening treated water and under a pressure at which the softening treated water maintains a liquid phase so as to electrolyze an oxidizable substance in the softening treated water;

an electrodialysis device in which electrolysis treated water obtained by the high-temperature and high-pressure electrolysis device is processed by a desalting treatment to obtain desalted water, comprising acid/alkali manufacturing electrodialysis devices, each of which treats water to be treated and obtains desalted water, an acid solution, and an alkali solution, are connected in series at two stages or more so that desalted water of an acid/alkali manufacturing electrodialysis device at an upstream side is processed by a desalting treatment of an acid/alkali manufacturing electrodialysis device at a downstream side; and a heat exchanger which heats the softening treated water by heat exchange between the softening treated water flowing into the high-temperature and high-pressure electrolysis device and the electrolysis treated water, wherein water having a low ion concentration as compared to that of water which is allowed to pass through an acid chamber and an alkali chamber of the acid/alkali manufacturing electrodialysis device at an upstream side is allowed to pass through an acid chamber and an alkali chamber of the acid/alkali manufacturing electrodialysis device at a downstream side, an acid solution and an alkali solution obtained by the acid/alkali manufacturing electrodialysis device at a downstream side are allowed to pass through the acid chamber and the alkali chamber of the acid/alkali manufacturing electrodialysis device at an upstream side, respectively, an acid storage bath storing an acid solution obtained by the acid/alkali manufacturing electrodialysis device at an upstream side and the acid/alkali manufacturing electrodialysis device at a downstream side and an alkali storage bath storing an alkali solution obtained by the acid/alkali manufacturing electrodialysis device at an upstream side and the acid/alkali manufacturing electrodialysis device at a downstream side are provided, and the acid solution and the alkali solution obtained by the acid/alkali manufacturing electrodialysis device at a downstream side are allowed to pass through the acid chamber and the alkali chamber of the acid/alkali manufacturing electrodialysis device at an upstream side via the acid storage bath and the alkali storage bath, respectively.

2. The water recovery apparatus according to claim 1, wherein the acid/alkali manufacturing electrodialysis devices each include between an anode and a cathode, a buffer chamber defined by two chambers adjacent thereto and bipolar membranes, and the water to be treated is processed by a desalting treatment by being allowed to sequentially pass through the buffer chamber of the acid/alkali manufacturing electrodialysis device at a downstream side, the buffer chamber of the acid/alkali manufacturing electrodialysis device at an upstream side, a desalting chamber of the acid/alkali manufacturing electrodialysis device at an upstream side, and a desalting chamber of the acid/alkali manufacturing electrodialysis device at a downstream side in this order.

3. A water recovery apparatus which treats wastewater and recovers treated water as product water, the water recovery apparatus comprising a softening device removing a hardness component in the wastewater;

a high-temperature and high-pressure electrolysis device in which softening treated water in the softening device is electrolyzed by supplying a direct current at a temperature of 100° C. to the critical temperature of the softening treated water and under a pressure at which the softening treated water maintains a liquid phase so as to electrolyze an oxidizable substance in the softening treated water;

an electrodialysis device in which electrolysis treated water obtained by the high-temperature and high-pressure electrolysis device is processed by a desalting treatment to obtain desalted water, comprising acid/alkali manufacturing electrodialysis devices, each of which treats water to be treated and obtains desalted water, an acid solution, and an alkali solution, are connected in series at two stages or more so that desalted water of an acid/alkali manufacturing electrodialysis device at an upstream side is processed by a desalting treatment of an acid/alkali manufacturing electrodialysis device at a downstream side; and a heat exchanger which heats the softening treated water by heat exchange between the softening treated water flowing into the high-temperature and high-pressure electrolysis device and the electrolysis treated water, wherein the acid/alkali manufacturing electrodialysis devices each include between an anode and a cathode, a buffer chamber defined by two chambers adjacent thereto and bipolar membranes, and the water to be treated is processed by a desalting treatment by being allowed to sequentially pass through the buffer chamber of the acid/alkali manufacturing electrodialysis device at a downstream side, the buffer chamber of the acid/alkali manufacturing electrodialysis device at an upstream side, a desalting chamber of the acid/alkali manufacturing electrodialysis device at an upstream side, and a desalting chamber of the acid/alkali manufacturing electrodialysis device at a downstream side in this order.

4. A water recovery apparatus which treats wastewater and recovers treated water as product water, the water recovery apparatus comprising:

a softening device removing a hardness component in the wastewater;

a high-temperature and high-pressure electrolysis device in which softening treated water in the softening device is electrolyzed by supplying a direct current at a temperature of 100° C. to the critical temperature of the softening treated water and under a pressure at which the softening treated water maintains a liquid phase so as to electrolyze an oxidizable substance in the softening treated water;

an electrodialysis device in which electrolysis treated water obtained by the high-temperature and high-pressure electrolysis device is processed by a desalting treatment to obtain desalted water, comprising acid/alkali manufacturing electrodialysis devices, each of which treats water to be treated and obtains desalted water, an acid solution, and an alkali solution, and which are connected in series at two stages or more so that desalted water of an acid/alkali manufacturing electrodialysis device at an upstream side is processed by a desalting treatment of an acid/alkali manufacturing electrodialysis device at a downstream side; and a deaeration device for processing a deaeration treatment on the electrolysis treated water whereby deaerated water from the deaeration device is treated by the electrodialysis device, wherein water having a low ion concentration as compared to that of water which is allowed to pass through an acid chamber and an alkali chamber of the acid/alkali manufacturing electrodialysis device at an upstream side is allowed to pass through an acid chamber and an alkali chamber of the acid/alkali manufacturing electrodialysis device at a downstream side, and an acid solution and an alkali solution obtained by the acid/alkali manufacturing electrodialysis device at a downstream side are allowed to pass through the acid chamber and the alkali chamber of the acid/alkali manufacturing electrodialysis device at an upstream side, respectively.

5. The water recovery apparatus according to claim 4, wherein an acid storage bath storing an acid solution obtained by the acid/alkali manufacturing electrodialysis device at an upstream side and the acid/alkali manufacturing electrodialysis device at a downstream side and an alkali storage bath storing an alkali solution obtained by the acid/alkali manufacturing electrodialysis device at an upstream side and the acid/alkali manufacturing electrodialysis device at a downstream side are provided, and the acid solution and the alkali solution obtained by the acid/alkali manufacturing electrodialysis device at a downstream side are allowed to pass through the acid chamber and the alkali chamber of the acid/alkali manufacturing electrodialysis device at an upstream side via the acid storage bath and the alkali storage bath, respectively.

6. The water recovery apparatus according to claim 4, wherein the acid/alkali manufacturing electrodialysis devices each include between an anode and a cathode, a buffer chamber defined by two chambers adjacent thereto and bipolar membranes, and the water to be treated is processed by a desalting treatment by being allowed to sequentially pass through the buffer chamber of the acid/alkali manufacturing electrodialysis device at a downstream side, the buffer chamber of the acid/alkali manufacturing electrodialysis device at an upstream side, a desalting chamber of the acid/alkali manufacturing electrodialysis device at an upstream side, and a desalting chamber of the acid/alkali manufacturing electrodialysis device at a downstream side in this order.

7. A water recovery apparatus which treats wastewater and recovers treated water as product water, the water recovery apparatus comprising:

a softening device removing a hardness component in the wastewater;

a high-temperature and high-pressure electrolysis device in which softening treated water in the softening device is electrolyzed by supplying a direct current at a temperature of 100° C. to the critical temperature of the softening treated water and under a pressure at which the softening treated water maintains a liquid phase so as to electrolyze an oxidizable substance in the softening treated water;

an electrodialysis device in which electrolysis treated water obtained by the high-temperature and high-pressure electrolysis device is processed by a desalting treatment to obtain desalted water, comprising acid/alkali manufacturing electrodialysis devices, each of which treats water to be treated and obtains desalted water, an acid solution, and an alkali solution, and which are connected in series at two stages or more so that desalted water of an acid/alkali manufacturing electrodialysis device at an upstream side is processed by a desalting treatment of an acid/alkali manufacturing electrodialysis device at a downstream side; and a deaeration device for processing a deaeration treatment on electrode water discharged from an electrode chamber of the electrodialysis device is provided whereby deaerated water from the deaeration device is circulated to the electrode chamber of the electrodialysis device, wherein the acid/alkali manufacturing electrodialysis devices each include between an anode and a cathode, a buffer chamber defined by two chambers adjacent thereto and bipolar membranes, and the water to be treated is processed by a desalting treatment by being allowed to sequentially pass through the buffer chamber of the acid/alkali manufacturing electrodialysis device at a downstream side, the buffer chamber of the acid/alkali manufacturing electrodialysis device at an upstream side, a desalting chamber of the acid/alkali manufacturing electrodialysis device at an upstream side, and a desalting chamber of the acid/alkali manufacturing electrodialysis device at a downstream side in this order.

8. The water recovery apparatus according to claim 7, wherein an acid storage bath storing an acid solution obtained by the acid/alkali manufacturing electrodialysis device at an upstream side and the acid/alkali manufacturing electrodialysis device at a downstream side and an alkali storage bath storing an alkali solution obtained by the acid/alkali manufacturing electrodialysis device at an upstream side and the acid/alkali manufacturing electrodialysis device at a downstream side are provided, and the acid solution and the alkali solution obtained by the acid/alkali manufacturing electrodialysis device at a downstream side are allowed to pass through the acid chamber and the alkali chamber of the acid/alkali manufacturing electrodialysis device at an upstream side via the acid storage bath and the alkali storage bath, respectively.

* * * * *